April 8, 1924.
W. J. BEISEL
SPRING WHEEL
Filed May 7, 1921
1,489,231
2 Sheets-Sheet 2
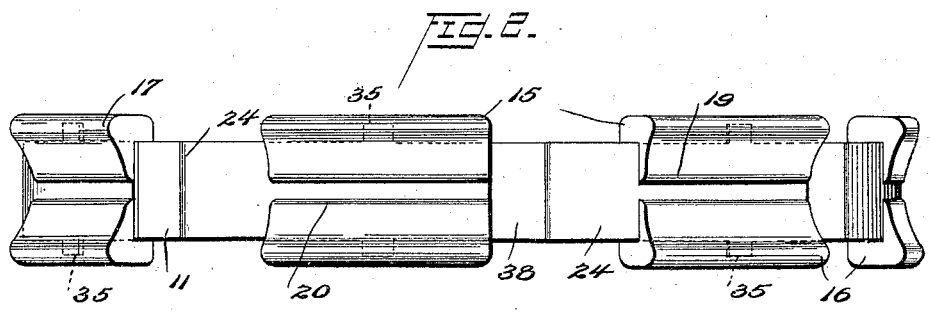
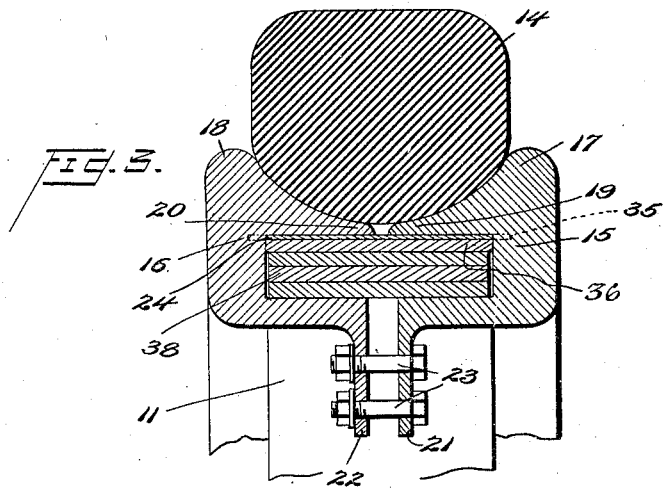
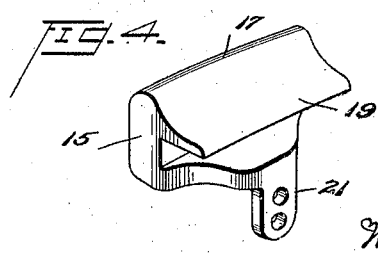
Inventor
William J. Beisel,
By Watson, Coit, Morse & Grindle,
Attorney Patented Apr. 8, 1924.

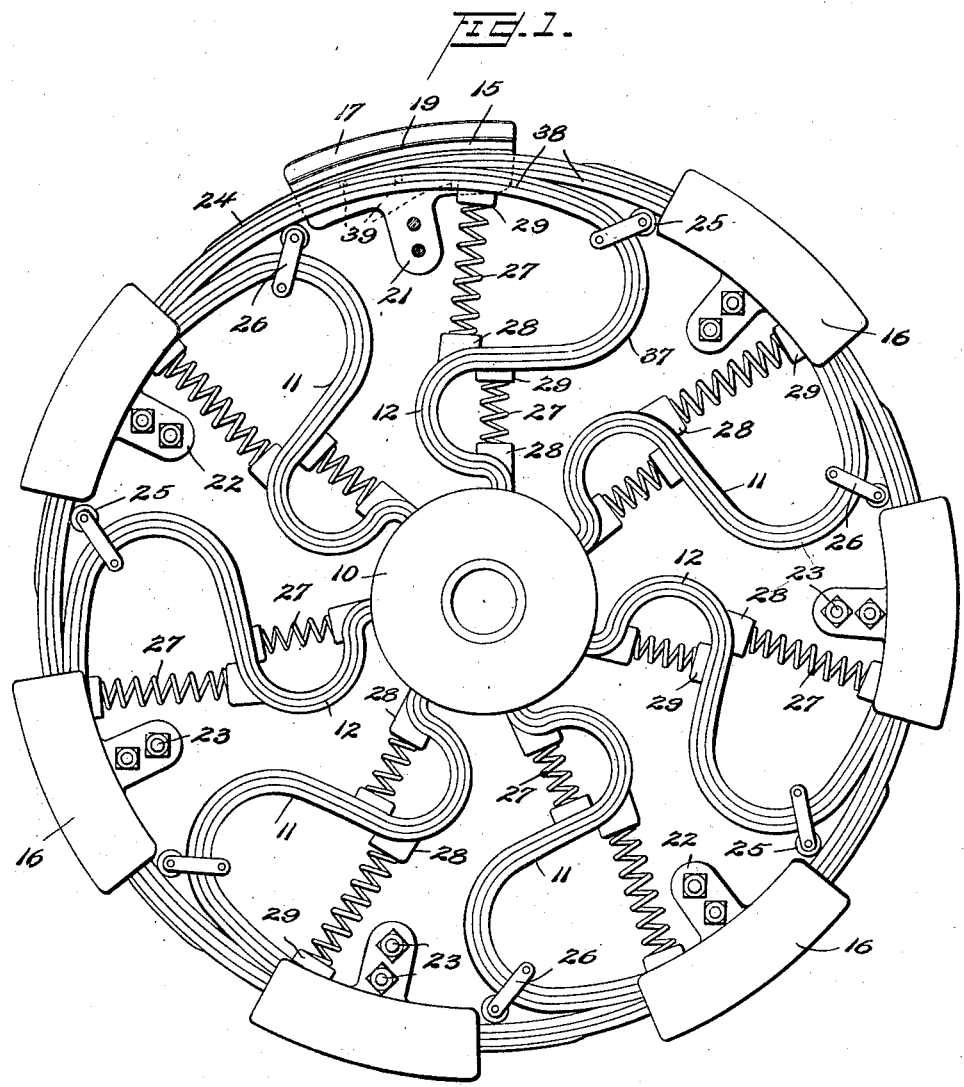

1,489,231

UNITED STATES PATENT OFFICE.

WILLIAM JAKOB BEISEL, OF PORT RICHMOND, NEW YORK, ASSIGNOR TO BEISEL SPRING WHEEL CORPORATION, OF NEW YORK, N. Y., A CORPORATION OF NEW YORK.

SPRING WHEEL.

Application filed May 7, 1921. Serial No. 467,622.

*To all whom it may concern:*

Be it known that I, WILLIAM J. BEISEL, a citizen of the United States, residing at Port Richmond, in the county of Richmond and State of New York, have invented certain new and useful Improvements in a Spring Wheel, of which the following is a specification.

This invention relates to spring wheels for use on vehicles, and is particularly adapted for use on motor vehicles, and constitutes an improvement in the structure of the wheel covered by my Patent Number 1,378,516, May 17, 1921. It includes many features similar to those disclosed in the said patent but also includes certain changes and additions serving to secure the desired functions and results more perfectly. It embodies simple, easily made parts and novel features of construction producing a wheel which is strong and efficient in use and attractive in appearance, and which dispenses with the necessity for the use of a pneumatic tire on it while securing the resilient and yielding effect ordinarily given by such tire, through local yielding at the rim when it strikes a small obstacle tending to elevate it. The novel features reside largely in the structure of the spring spokes and rim of the wheel and the connected cooperating parts. The novel features will be more fully understood from the following description and claims taken with the drawings.

In the drawings:

Figure 1 is a side view partly in section of a wheel embodying my invention with the tire removed.

Figure 2 is an edge view of the wheel.

Figure 3 is a cross section through the rim portion and tire retaining members of Figure 1, a solid tire being shown in position on it; and Figure 4 is a perspective view of one of the retaining members for the tire.

As shown in Figure 1, the wheel embodies a central hub 10 which may be of any suitable construction which will properly retain and support the spokes hereinafter described, but which preferably embodies the construction disclosed in my Patent Number 1,378,517, May 17, 1921. The wheel also includes a suitable number of similar spokes 11, seven being shown in the preferred form illustrated, and each of these spokes is composed of a series of superposed steel plates of uniform width, flat in cross section, constituting what is known as a leaf spring. One important feature of the invention resides in the form and in the structural and functional relations of the parts of these spokes to each other and to adjacent spokes in the series. Each spoke enters the hub radially but at a point near the margin of the hub is bent in the plane of the wheel and is then curved gradually and with substantial uniformity outwardly and back across the plane of that portion entering the hub forming a curved portion 12 on one side of that plane. The spoke then continues at a slight outward incline beyond said plane and is then curved gradually and with substantial uniformity outwardly and back towards said plane forming a substantially uniform curved portion 37 on the opposite side of said plane from the curved portion 12. The radius of the curve is gradually increased at a point just before reaching said plane and beyond it until the outer surface of the outer layer of the spoke is in the arc of a circle with the center of the wheel hub as its center and is in position to form part of the rim of the wheel. The extension 38 from curve 37 thus formed overlaps and slidably fits on a similar extension on the adjacent spoke on one side of it and extends over it for approximately half its length. The layers of each spoke taper in thickness towards the end of the extension 38 and each underlying layer terminates sufficiently short of the end of the overlying layer and the taper is such that the inner face of the extension on one spoke will accurately and closely fit the outer curved face of the adjacent extension for sliding engagement for a material distance circumferentially of the wheel. It will be noted that the arc of the curved portion 37 is considerably greater than that of curved portion 12, and thus the yielding effect of portion 37 will be greater than that of the portion 12. The two bends or curved portions however being oppositely disposed on different sides of the plane of connection to the hub will so evenly distribute the distortion and strains resulting from compression as to reduce any chance of breakage to a minimum. The outer ends of the extensions 38 will of course yield more readily even than the curved portions 37, and by local yielding when moving over an uneven surface will transmit only a very small part, if any, of the necessary movement to the hub or vehicle in much the same way as does a pneumatic tire. It thus secures the functions and advantages of a pneumatic tire without the necessity for its use, and avoids all of the numerous well known defects in and objections to pneumatic tires. The width of the spokes and of the layers forming them being much greater than their thickness, they have ample strength to resist and stand side strains on the wheel without permanent distortion or breakage. It will be noted that the exterior diameter of the hub is approximately one-fourth the inner diameter of the rim and that the bend next to the hub commences very near the hub.

Coiled springs 27 may if desired be interposed between the facing parts of the curved portions 12 and 37, thus assisting in sustaining the load, and they may be secured in place by sockets 28 and 29 securely fastened to the facing layers or leaves of the spoke as shown in Figure 1. For the purpose of lubrication the layers of the spokes may be provided with small holes 39 through them at intervals but out of line with each other as shown in dotted lines in Figure 1, and these may be filled with suitable lubricant. It will be observed that the overlapping ends of adjacent spokes all taken together make up an outer complete circular rim having a width equal to the width of the spokes, and that each section 38 may and will in operation move longitudinally or circumferentially on the section on which it rests when subjected to radial pressure in supporting the vehicle and in passing over uneven surfaces, and that the two sections will also move inwardly together towards the hub under such pressure. This does not break the continuity of the rim although it permits local yielding. By this arrangement, when the wheel strikes an obstruction, the particular portion making contact with it will yield without causing any appreciable movement of those parts of the rim at other portions of the circumference. One essential feature in securing these results is that the rim shall be made up of a continuous series of overlapping ends of spring spokes throughout its circumference, and while it is preferable that these spokes and overlapping ends shall be composed of layers or leaves each of which has a width equal to that of the rim so as to extend entirely across it, that specific form is not necessary to a successful and useful embodiment of the invention in its broader aspects, and therefore it is not limited to that particular form beyond what is indicated by the appended claims. It will also be understood that the invention is not limited to the use of any particular number of separate spoke members not stated in the claims.

I preferably use on the yielding rim of my wheel a solid rubber tire 14, shown in Figure 3. In order to properly hold that tire in place, I make use of the tire retaining members 15, 16, which fit against the outer portion of the spring spokes and which are clamped to them. These retaining members are, of course, made in the form of a segment of a circle with ribs or projections 17, 18, on the margin to hold the tire against side movement. They are also preferably provided with the tapering lips 19, 20 which extend over the outer periphery of the rim in toward each other, thus furnishing some support for the tire. The inner portions of the retaining members have lips or flanges 21, 22 through which bolts 23 pass to clamp each pair of retaining members together on the wheel rim.

As will be seen by reference to Figure 1, these retaining members do not constitute together a complete circle, but there is a break between adjacent pairs, and this is to allow for the movement of the wheel rim, as heretofore indicated. In order to prevent the overlapping ends of the adjacent spokes from chafing the inner surface of the tire, I make use of a thin metal plate extending around the rim lapping the joints between adjacent spokes. In Figure 1 such a plate marked 24 is shown secured to the inner surface of the parts marked 19, 20 of the tire retaining clamps. A plate 24 is, in this instance, secured to each pair of clamps and covers the joint in the rim at that point.

In order that there shall be proper relative longitudinal or peripheral movement of the lapping ends of adjacent spokes and the leaves of the same spokes within the clamping members 15 and 16, one layer or leaf of each spoke is made somewhat wider where it enters the last of the two pairs of clamps through which it passes than at other points and than the other layers or spokes at that point whereby its side margins will be gripped and held by the inner side faces of the clamping members 15 and 16 so that the said layer or leaf and clamps will move together permitting free longitudinal movement of the other layers in reference to them. This is shown in Figure 3 where for purposes of illustration the outer layer or leaf marked 36 of the overlapping portion of the outer spoke is wider than the other leaves of this spoke and than the leaves of the inner overlapped portion of the adjacent spoke. It will be understood, however, that the invention is not limited to clamping the outer layer as distinguished from the inner layer. The plate 24 is detachably connected to the clamping members so as to move therewith by side ears or projections 35 fitting in corresponding side sockets in the inner faces of the clamping members 15 and 16 as shown in dotted lines in Figures 2 and 3.

In order to facilitate the movement of a section of one spoke on the next spoke, I preferably make use of an antifriction roller 25 bearing against the inner surface of one spoke and carried from the next spoke by a clamp 26.

It will also be understood that the invention is not limited to the particular form or curve radius of the two side curved portions of the spokes beyond what is called for in the claims.

Having thus described the invention, what is claimed as new and desired to be secured by Letters Patent is:

1. A spring wheel for vehicles comprising a hub and a series of leaf spring spokes which are duplicates of each other, having radial inner ends secured to the hub and two successive curved portions along their lengths extending on opposite sides of the radial planes of the inner ends, the first commencing near the surface of the hub and outer end extensions from the outer curved portions tapering in thickness to their ends, the radii of the curves of said extensions gradually increasing towards their ends bringing their outer surfaces at and near their ends into the arc of a circle having the center of the hub as its center and with their inner surfaces overlapping and closely fitting the outer curved surfaces of similar extensions on adjacent spokes whereby the overlapping of adjacent spokes throughout the series around the wheel will produce a continuous but locally and radially yielding rim, the exterior diameter of the hub being approximately one-fourth the inner diameter of the rim.

2. A spring wheel for vehicles comprising a hub and a series of leaf spring spokes which are duplicates of each other having radial inner ends secured to the hub and two successive curved portions along their lengths extending on opposite sides of radial planes of the inner ends, the first commencing near the surface of the hub and outer end extensions from the outer curved portions tapering in thickness to their ends, the radii of the curves of said outer extensions gradually increasing towards their ends bringing their outer surfaces at and near the ends into the arc of a circle having the center of the hub as its center and with their inner surfaces overlapping and closely fitting the outer curved surfaces of similar extensions on adjacent spokes whereby the overlapping of adjacent spokes throughout the series around the wheel will produce a continuous but locally and radially yielding rim, the outer curved portions having a radius of curvature materially greater than that of the inner curved portions and extending a greater distance from the radial plane of the inner end of the spoke, the exterior diameter of the hub being approximately one-fourth the inner diameter of the rim.

3. A spring wheel for vehicles comprising a hub and a series of leaf spring spokes which are duplicates of each other secured thereto having inner ends in radial planes entering said hub, the spokes being bent laterally of said planes at points near the outer surface of the hub, and having curved portions extending outwardly and back towards and across the radial planes of the inner ends, the crossing portions being slightly inclined outwardly, and having curved portions extending from said inclined portions outwardly and back to points near the radial planes of the inner ends and extensions therefrom on curves of gradually increasing radius overlapping and closely fitting the outer surfaces of similar extensions on adjacent spokes throughout substantially half of their length, the outer surfaces of the overlapping portions being on the arcs of circles with the center of the hub as their centers and each leaf of a spoke being tapered in thickness to a thin end with each inner layer terminating short of the end of the next outer layer to slidably fit the curved outer surface of the adjacent spoke forming together a continuous rim, the exterior diameter of the hub being approximately one-fourth the inner diameter of the rim.

4. A spring wheel for vehicles comprising a hub and a series of leaf spring spokes which are duplicates of each other secured thereto having radial inner ends entering said hub, each spoke having a bend laterally of the plane of its inner end at a point near the outer surface of the hub, curved portions extending outwardly from said bends and back towards and across the radial planes of the inner ends, curved portions extending from said first named curved portions outwardly and back to points near the radial planes of the ends entering the hub and extensions therefrom on curves of gradually increasing radii overlapping and closely fitting the outer surfaces of similar extensions on adjacent spokes throughout substantially half of their lengths, the outer surfaces of the overlapping portions being on the arc of a circle with the center of the hub as its center and each leaf of the spoke being tapered in thickness to a thin end with each inner layer terminating short of the end of the next outer layer to slidably fit the curved outer surface of the adjacent spoke forming together a continuous rim, the outer curved portion having a radius of curvature materially greater than the inner curved portion and extending a greater distance from the radial plane of the inner end of the spoke, the exterior diameter of the hub being approximately one-fourth the inner diameter of the rim.

5. A spring wheel for vehicles comprising a hub and a series of leaf spring spokes which are duplicates of each other, each spoke having a radial inner end secured to the hub and two successive curved portions along its length extending on opposite sides of the radial plane of the inner end and an outer end extension from the outer curved portion tapering in thickness to a thin end edge, the radius of the curve of said extension gradually increasing towards its end bringing its outer surface at and near its end into the arc of a circle having the center of the hub as its center and with its inner surface overlapping and closely fitting the outer curved surface of a similar extension on the adjacent spoke whereby the overlapping of adjacent spokes throughout the series around the wheel will produce a continuous but locally and radially yielding rim, and coiled compression springs interposed in each spoke between facing surfaces of said two curved portions.

In testimony whereof I hereunto affix my signature.

WILLIAM JAKOB BEISEL.